US012009591B2

(12) United States Patent
Rossiter et al.

(10) Patent No.: US 12,009,591 B2
(45) Date of Patent: Jun. 11, 2024

(54) ELECTROMAGNETIC BAND GAP STRUCTURE (EBG)

(71) Applicant: Aptiv Technologies AG, Schaffhausen (CH)

(72) Inventors: Ryan K. Rossiter, Kokomo, IN (US); Mingjian Li, Agoura Hills, CA (US); Jun Yao, Kokomo, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 17/488,560

(22) Filed: Sep. 29, 2021

(65) Prior Publication Data

US 2022/0021109 A1 Jan. 20, 2022

Related U.S. Application Data

(63) Continuation of application No. 16/776,799, filed on Jan. 30, 2020, now Pat. No. 11,165,149.

(51) Int. Cl.

*H01Q 1/52* (2006.01)
*H01Q 5/30* (2015.01)
*H01Q 21/06* (2006.01)
*H01Q 21/28* (2006.01)

(52) U.S. Cl.

CPC ............. *H01Q 1/521* (2013.01); *H01Q 1/525* (2013.01); *H01Q 5/30* (2015.01); *H01Q 21/061* (2013.01); *H01Q 21/28* (2013.01)

(58) Field of Classification Search

CPC .... H01Q 21/06; H01Q 21/061; H01Q 21/064; H01Q 21/065; H01Q 1/52; H01Q 1/525; H01Q 1/521

See application file for complete search history.

(56) References Cited

U.S. PATENT DOCUMENTS 6,933,812 B2 8/2005 Sarabandi et al.
7,307,596 B1 12/2007 West
7,864,117 B2 * 1/2011 Aurinsalo ............ H01Q 9/0435 343/702

(Continued)

FOREIGN PATENT DOCUMENTS

CN 102510658 A 6/2012
CN 102683826 A 9/2012

(Continued)

OTHER PUBLICATIONS 21151765.1, "Extended European Search Report Received".

(Continued)

*Primary Examiner* — Jason M Crawford
(74) *Attorney, Agent, or Firm* — Billion & Armitage

(57) ABSTRACT

An electromagnetic band-gap (EBG) structure includes an antenna substrate layer, first conductive regions, and second conductive regions. The antenna substrate includes a first planar surface and a second planar surface. The first conductive regions are located on the first planar surface of the antenna substrate and separated from adjacent first conductive regions by a first distance. The second conductive regions are located on the first planar surface of the antenna substrate and are separated from the first conductive regions by a second distance and wherein the second conductive regions at least partially surround the first conductive regions.

20 Claims, 8 Drawing Sheets

(56) References Cited

U.S. PATENT DOCUMENTS

| | | | | |
|---|---|---|---|---|
| 7,982,673 | B2 | 7/2011 | Orton et al. | |
| 8,004,369 | B2 | 8/2011 | Kwon et al. | |
| 9,219,313 | B2 | 12/2015 | Georgescu et al. | |
| 9,515,387 | B2 | 12/2016 | Hung et al. | |
| 9,711,867 | B2 | 7/2017 | Jecko et al. | |
| 9,806,431 | B1 * | 10/2017 | Izadian | H01Q 21/005 |
| 9,865,932 | B2 | 1/2018 | Yukimasa | |
| 10,044,087 | B2 * | 8/2018 | Huang Chen | H01P 5/028 |
| 10,236,591 | B2 * | 3/2019 | Kirino | H01Q 21/06 |
| 10,559,890 | B2 * | 2/2020 | Kirino | G01S 7/03 |
| 10,707,584 | B2 * | 7/2020 | Kirino | H01Q 21/064 |
| 11,165,149 | B2 * | 11/2021 | Rossiter | H01Q 21/28 |
| 11,411,292 | B2 * | 8/2022 | Kirino | H01Q 21/064 |
| 11,723,199 | B2 * | 8/2023 | Yang | H10B 43/30<br>257/324 |
| 2012/0092224 | A1 * | 4/2012 | Sauleau | H01Q 21/005<br>343/771 |
| 2012/0280770 | A1 * | 11/2012 | Abhari | H01P 1/207<br>333/209 |
| 2013/0207867 | A1 | 8/2013 | Georgescu et al. | |
| 2013/0214984 | A1 | 8/2013 | Zaghloul et al. | |
| 2013/0293323 | A1 * | 11/2013 | Nakase | H01P 3/00<br>333/236 |
| 2016/0204514 | A1 * | 7/2016 | Miraftab | H01Q 21/005<br>343/731 |
| 2016/0344093 | A1 * | 11/2016 | Tagi | H01Q 1/525 |
| 2017/0194716 | A1 * | 7/2017 | Kirino | H01P 3/081 |
| 2018/0090851 | A1 * | 3/2018 | Feldman | H01Q 1/42 |
| 2018/0102593 | A1 * | 4/2018 | Gong | H01Q 21/064 |
| 2018/0277946 | A1 * | 9/2018 | Murata | H01Q 1/48 |
| 2019/0081412 | A1 * | 3/2019 | Hügel | H01P 1/042 |
| 2019/0109361 | A1 * | 4/2019 | Ichinose | H01P 3/123 |
| 2020/0076072 | A1 * | 3/2020 | Keyrouz | H01P 1/2005 |
| 2020/0091599 | A1 * | 3/2020 | Nakamura | H01Q 1/38 |
| 2020/0168974 | A1 * | 5/2020 | Vosoogh | H01P 1/2005 |
| 2020/0185802 | A1 * | 6/2020 | Vilenskiy | H01P 1/20 |
| 2020/0212594 | A1 * | 7/2020 | Kirino | H01Q 21/064 |
| 2020/0287293 | A1 * | 9/2020 | Shi | H01Q 21/005 |
| 2020/0358173 | A1 * | 11/2020 | Jong | H01Q 3/2617 |
| 2021/0242581 | A1 * | 8/2021 | Rossiter | H01Q 21/061 |
| 2022/0021109 | A1 * | 1/2022 | Rossiter | H01Q 1/525 |

FOREIGN PATENT DOCUMENTS

| | | | |
|---|---|---|---|
| CN | 102820501 | A | 12/2012 |
| CN | 103035460 | A | 4/2013 |
| CN | 103687280 | A | 3/2014 |
| CN | 102683826 | B | 4/2014 |
| CN | 103943969 | A | 7/2014 |
| CN | 104137333 | A | 11/2014 |
| CN | 104332677 | A | 2/2015 |
| CN | 104137333 | B | 3/2017 |
| CN | 103687280 | B | 7/2017 |
| CN | 109041413 | A | 12/2018 |
| WO | 2008020249 | A1 | 2/2008 |
| WO | 2018199753 | A1 | 11/2018 |
| WO | 2019022651 | A1 | 1/2019 |

OTHER PUBLICATIONS

Assimonis, et al., "Design and Optimization of Uniplanar EBG Structures for Low Profile Antenna Applications and Mutual Coupling Reduction", IEEE Transactions on Antennas and Propagation, IEEE Service Center, Piscataway, NJ, US,vol. 60, No. 10, XP011466636,ISSN: 0018-926X, DOI:10.1109/TAP.2012.2210178 Chapters I, II and III.B; figures 1,2, 10, 11; table I, Oct. 1, 2012, pp. 4944-4949.

Kamadin, et al., "Printed dipole with slot EBG structures with artificial magnetic conductor and band-notched behaviors.", IEEE Int. RFM Conf. Seremban, Malaysia, Dec. 2011.

Mbairi, et al., "Microwave bandstop filters using novel artificial periodic substrate electromagnetic band gap structures.", Components and Packaging Technologies, IEEE Transactions on, 32:273282, 2009.

Mohajer-Iravani, et al., "Wideband circuit model for planar EBG structures", IEEE Trans. Adv. Packag., vol. 33, No. 2, 345354, May 2010.

Seivenpiper, et al., "High-impedance electromagnetic surfaces with a forbidden frequency band", IEEE Trans. Microwave Theory Tech., vol. 47 , pp. 20592074, Nov. 1999.

Waterhouse, et al., "A Small electromagnetic bandgap structure", Microwave Symposium Digest, IEEE MTT-S International, pp. 602 605, 2006.

Yang, et al., "A novel compact electromagnetic-bandgap (EBG) structure and its applications for microwave circuits", IEEE Trans. Microw. Theory Tech., vol. 53, No. 1, pp. 183190, Jan. 2005.

"Extended European Search Report dated Nov. 8, 2023", 12 Pages.

* cited by examiner

ELECTROMAGNETIC BAND GAP STRUCTURE (EBG)

CROSS-REFERENCE TO RELATED APPLICATION

This is a divisional application and claims benefit of U.S. patent application Ser. No. 16/776,799, filed Jan. 30, 2020, the entire disclosure of each of which is hereby incorporated by reference.

FIELD

This disclosure is generally directed to radio frequency (RF) antennas and, more specifically to electromagnetic band gap structures (EBGs) utilized to reduce coupling between adjacent RF antennas.

BACKGROUND

An electromagnetic band-gap (EBG) structure is utilized to block electromagnetic waves in certain frequency bands. EBG structures are commonly utilized to prevent coupling between adjacent antennas within a particular frequency band. For antennas fabricated on printed circuit boards, a commonly utilized EBG structure is a three-dimensional (3D) mushroom-like structure in which a plate is connected to a ground plane via a metallic via. However, fabrication of metallic vias in the numbers required increases the fabrication cost significantly. It would be beneficial to design an EBG structure that provides good performance in blocking electromagnetic waves within a certain frequency band but at a low fabrication cost.

SUMMARY

According to one aspect, an electromagnetic band-gap (EBG) structure is provided that includes an antenna substrate and at least a first conductive region and second conductive region fabricated on the first planar surface of the antenna substrate. The first conductive regions are located on the first planar surface of the antenna substrate and separated from adjacent first conductive regions by a first distance. The second conductive regions are also located on the first planar surface, wherein the second conductive regions are separated from the first conductive regions by a second distance and wherein the second conductive regions at least partially surround the first conductive regions.

According to another aspect, a planar antenna board is provided that includes an antenna substrate layer, a top conductive layer, and a bottom conductive layer. The antenna substrate layer has a first planar surface and a second planar surface opposite the first planar surface. The top conductive layer is located on the first planar surface and the bottom conductive layer is located on the second planar surface. A first E-band antenna is fabricated in the top conductive layer, wherein the first E-band antenna configured to receive/transmit an E-band frequency radio frequency (RF) signal. A second E-band antenna is fabricated in the top conductive layer, the second E-band antenna configured to receive/transmit an E-band frequency RF signal, wherein the second E-band antenna is offset in the x-y plane from the first E-band antenna. A periodic array of two-dimensional electromagnetic band-gap (EBG) structures are also fabricated in the top conductive layer. The periodic array of 2D EBG structures is located between the first E-band antenna and the second E-band antenna, wherein each EBG structure includes a plurality of slots formed in the top conductive layer, wherein the periodic array of 2D EBG structures blocks surface waves in the E-band frequency range.

DETAILED DESCRIPTION

According to one aspect, this disclosure is directed to a two-dimensional electromagnetic band gap structure (EBG) utilized to reduce coupling between adjacent antennas elements. In particular, the EBGs are utilized on an antenna board (e.g., printed circuit boards) that includes at least a planar antenna substrate layer, a top conductive layer and a bottom conductive layer. A number of methods of fabricating antennas may be utilized. For example, in some embodiments antennas elements (i.e., radiating elements) are fabricated on the antenna board via selective etching of the top conductive layer. In other embodiments, rather than selectively etch a top conductive layer to leave a desired conductive pattern, the desired conductive pattern is selectively plated. In other embodiments, various other well-known fabrication techniques may be utilized to fabricate antenna structures, including plastic injection molding. The EBG structures are fabricated in the region between the adjacent antennas and include a repeating or periodic pattern of EBG structures. The EBG structures are likewise fabricated via the selective etching of the top conductive layer. The process of etching the top conductive layer to fabricate the EBG structures is the same as the process of etching the top conductive layer to fabricate the antennas, and thus does not present a substantial additional cost to the fabrication process. In particular, the fabrication process does not require modification of the underlying antenna substrate layer, while still providing the desired decoupling between the adjacent antennas.

Figure 1A:
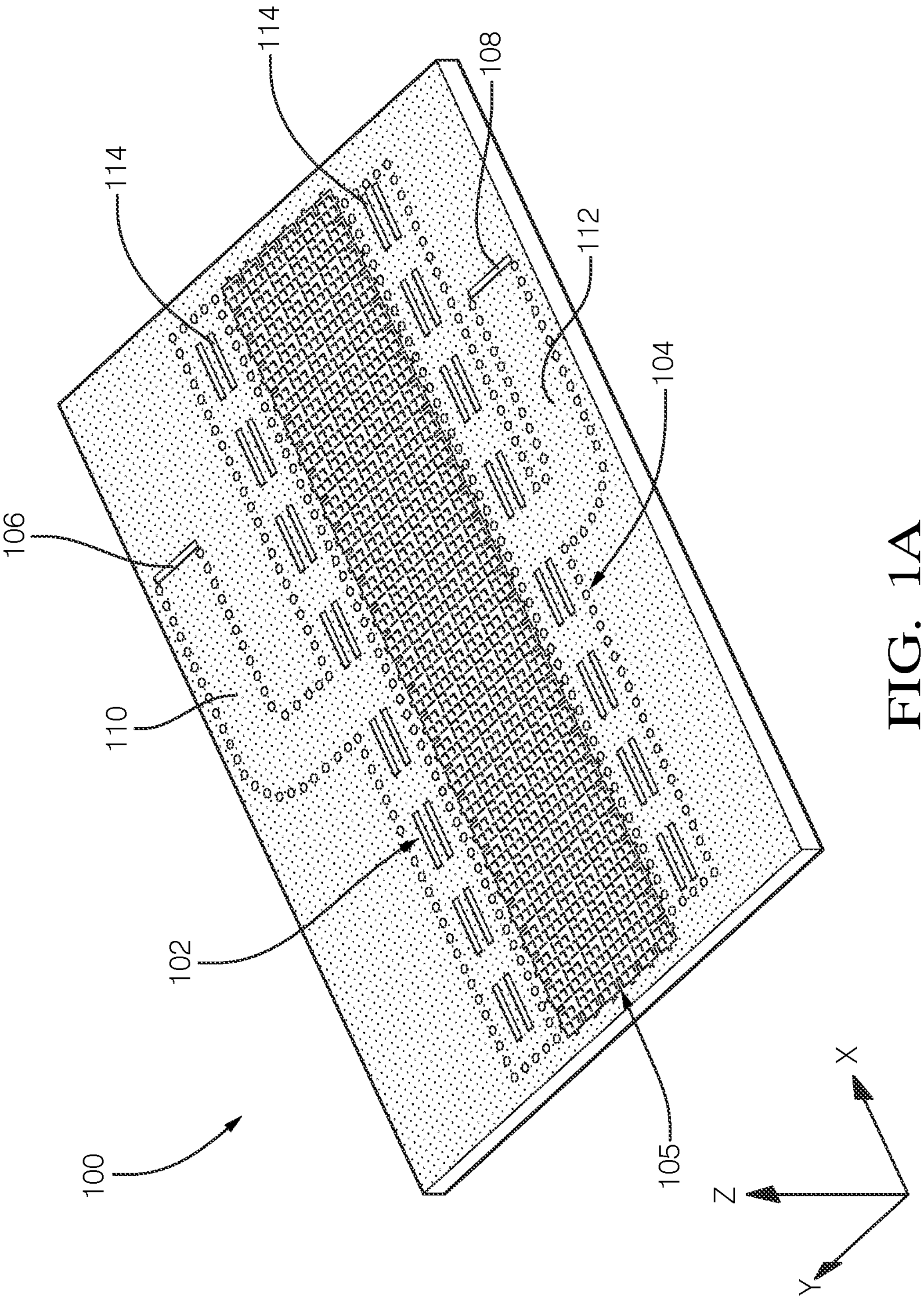
FIGS. 1*a*-1*c* are perspective, top and side views, respectively, of an antenna board utilizing a two-dimensional (2D) electromagnetic band-gap (EBG) structures according to some embodiments.
Figure 1B:
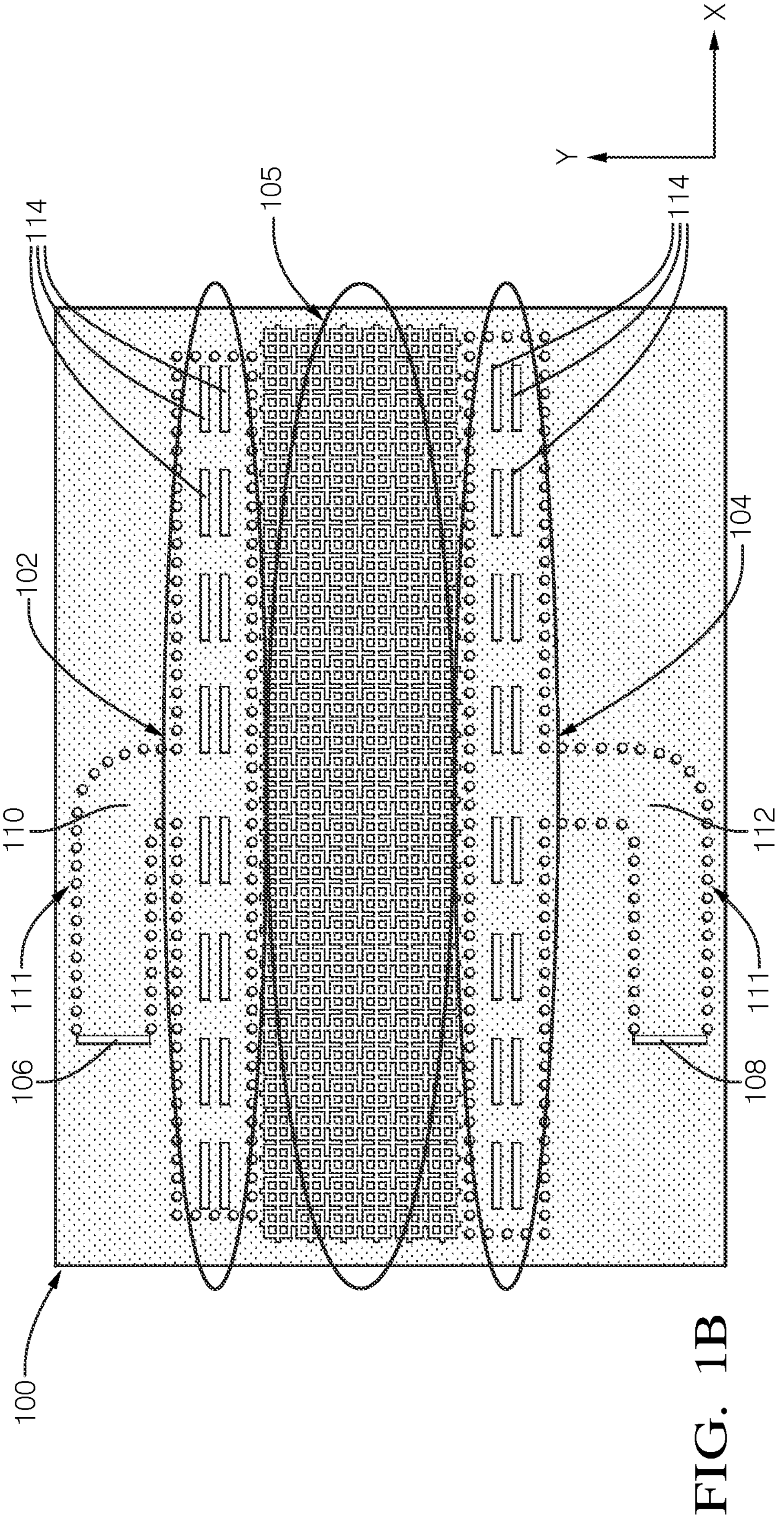
Figure 1C:
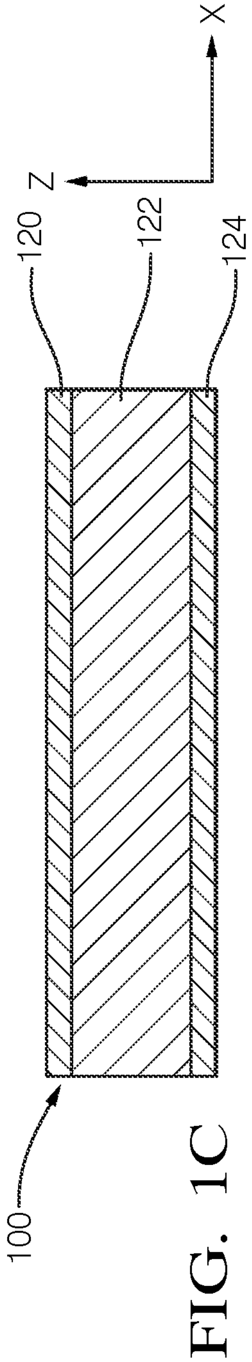

Referring now to FIGS. 1*a*-1*c*, an antenna board 100 is illustrated that utilizes two-dimensional (2D) electromagnetic band-gap (EBG) structures according to some embodiments. The antenna board 10 includes at least one receiving antenna 102, at least one transmission antenna 104, and an EBG region 105 located between the at least one receiving antenna 102 and the at least one transmission antenna 104. In some embodiments, antenna board 100 is fabricated on a laminated structure such as a printed circuit board (PCB)

having at least a top conductive layer 120, an antenna substrate layer 122, and a bottom conductive layer 124 (shown in FIG. 1*c*). Radio frequency (RF) waves propagating within the antenna substrate layer 122, constrained in the z-direction by top conductive layer 120 and bottom conductive layer 124. A plurality of conductive vias 111 extending between the top conductive layer 120 and the bottom conductive layer 124 constrain the RF wave in the lateral direction (i.e., in the x-y plane). In this way, RF waveguides are defined within the antenna substrate layer 122 by the top conductive layer 120, bottom conductive layer 124 and plurality of conductive vias 111. RF signals received by the receiving antenna 102 are transmitted via waveguide 110 to output port 106. Likewise, RF signals received at input port 108 are transmitted via waveguide 112 to transmission antenna 104. The antenna board 100 illustrated in FIGS. 1*a* and 1*b* is referred to as a slot antenna, wherein the at least one receiving antenna 102 and the at least one transmission antenna 104 are fabricated by forming a plurality of slots 114 within the top conductive layer 120. Each slot exposes the antenna substrate layer 122 located adjacent to the top conductive layer 120. Fabrication of the slots 114 may utilize etching (removal) of the top conductive layer 120. In other embodiments, rather than slot antennas, other types of antennas may be fabricated on the PCB such as microstrip antennas, stick antennas, etc.

In some embodiments, antenna board 100 may be utilized as part of a radar sensing system, in which transmission antenna 104 propagates an RF signal and receiving antenna 102 receives a reflection of the RF signal that is utilized to detect, range, and/or track objects. In other embodiments, antenna board 100 may be utilized in a multiple-input multiple output (MIMO) communication system that utilizing a plurality of transmission antennas and a plurality of receiving antennas to provide wireless communication between two points. For example, in the MIMO embodiments, rather than a transmission antenna 104 and a receiving antenna 102 located on the antenna board, but antennas 102, 104 may be receiving antennas and/or both may be transmission antennas (or both may be transceivers, capable of both transmitting and receiving RF signals). In some embodiments, the at least one receiving antenna 102 and the at least one transmission antenna 104 operate in the E-band, which extends from approximately 60 gigahertz (GHz) to 90 GHz. In particular, in some embodiments the at least one receiving antenna 102 and the at least one transmission antenna 104 operate in a frequency range of between approximately 72 GHz and 82 GHz, and in some embodiments operate in a frequency range of between 76 GHz and 78 GHz. EBG region 105 is designed to create a stopband within the operating frequency of the at least one receiving antenna 102 and the at least one transmission antenna 104 to decrease coupling between the respective antennas. In some embodiments, the stopband operates over the E-band range (e.g., 60 Ghz-90 GHz). In other embodiments, the EBG region 105 may be selected to provide a stopband in the frequency of range of between 72 GHz and 82 GHz, and in some embodiments operate in a frequency range of between 76 GHz and 78 GHz. Decreasing the mutual coupling between the respective antennas increases the performance of the respective antennas. For example, in embodiments utilizing the antennas for radar sensing, decreased coupling between the respective transmission antenna 104 and receiving antenna 102 reduces the noise floor associated with each antenna, thereby increasing the signal-to-noise (SNR) ratio of the radar sensing system and increasing the detection range of the radar sensing system.

In some embodiments, the plurality of EBG structures located in the EBG region 105 are fabricated by selectively etching (removing) conductive material from the top conductive layer 120. One benefit of the antenna board 100 shown in FIGS. 1*a*-1*c* is that the step of etching of the top conductive layer 120 to fabricate the antenna slots 114 for the receiving/transmitting antennas and etching of the top conductive layer 120 to fabricate the plurality of EBG structures may be performed at the same time. That is, the cost of fabricating the plurality of EBG structures within EBG region 105 is extremely low (approximately zero) as no additional fabrication steps are required. As discussed above, in other embodiments other fabrication methods may be utilized, such as plating techniques and/or injection molding techniques. In general, however, regardless of the fabrication technique utilized, the 2D geometry of the EBG structures—similar to the 2D geometry of the antenna elements in the same plane as the EBG structures—means that fabrication of the antenna elements and fabrication of the EBG structures will not add additional (or much additional) cost to the process.

The geometry of the EBG structures is selected to prevent the propagation of surface waves along the top conductive layer 120 between the at least one receiving antenna 102 and the at least one transmission antenna 104. For example, as discussed in more detail with respect to FIG. 2, in some embodiments each EBG structure includes a plurality of slots etched within the top conductive layer that results in a plurality of conductive regions positioned in a defined pattern, separated from one another via the etched slots. In the embodiments shown in FIGS. 2*a*-2*c*, a plurality of square-shaped conductive regions are positioned within an interior of the EBG structure, and a plurality of L-shaped conductive regions are positioned at least partially surrounding each square-shaped conductive region. In another embodiment shown in FIGS. 3*a*-3*c*, the EBG structure is comprised of an H-shaped slot etched in the conductive layer.

Figure 2A:
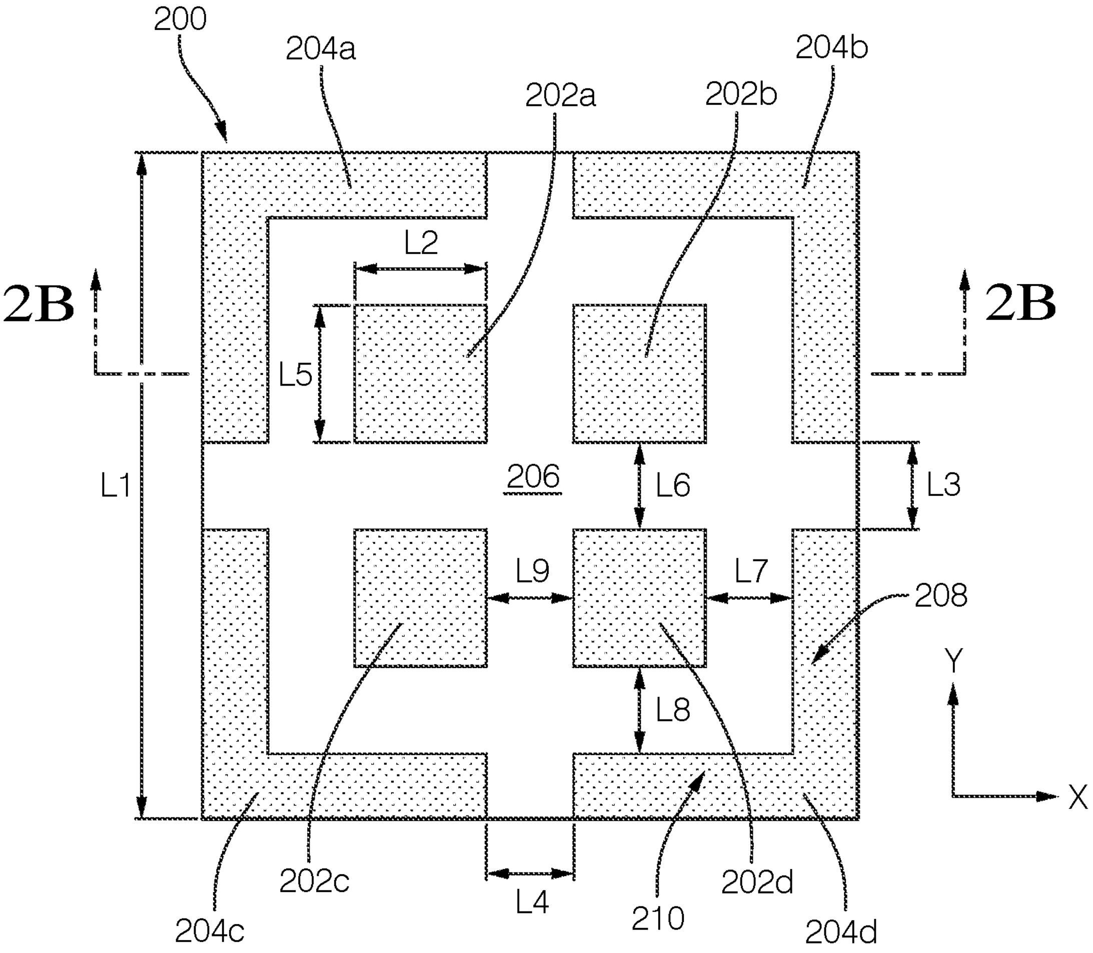
FIG. 2*a* is a top view of a 2D EBG structure according to some embodiments.
Figure 2B:
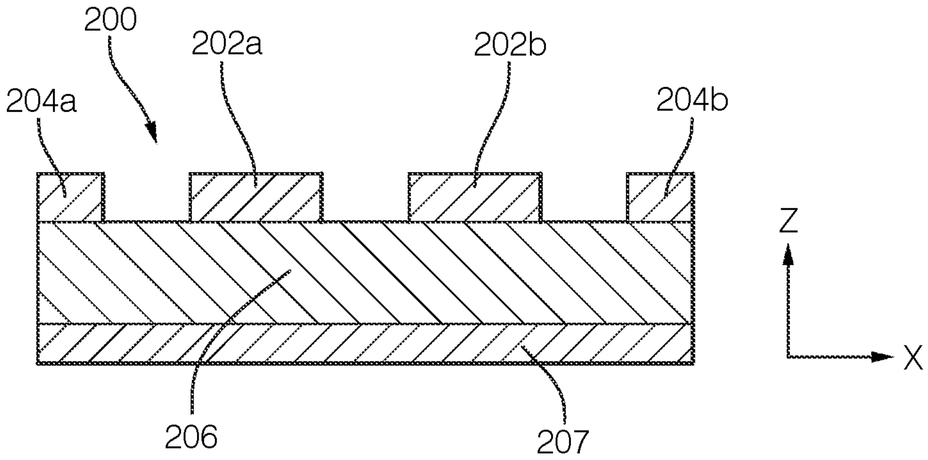
FIG. 2*b* is a top view of a plurality of 2D EBG structure according to some embodiments.
Figure 2C:
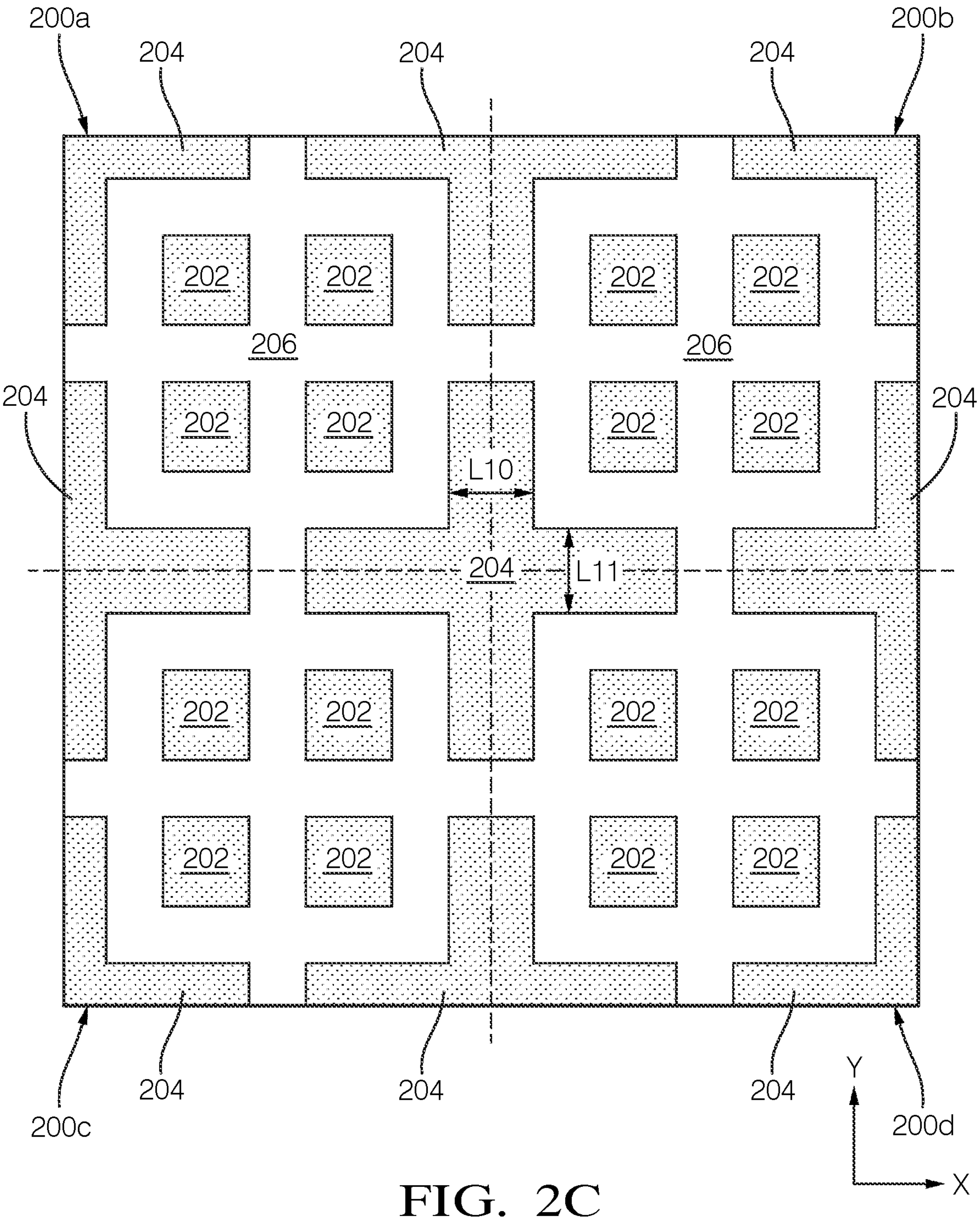
FIG. 2*c* is a cross-sectional view taken along line 2*b*-2*b* in FIG. 2*a*.

Referring to FIGS. 2*a*-2*c*, an EBG structure 200 according to some embodiments is illustrated. FIG. 2*a* is a top view of a single EBG structure 200. FIG. 2*b* is a cross-sectional view of the EBG structure 200 taken along line 2*b*-2*b* shown in FIG. 2*a*. FIG. 2*c* is a top view illustrating a plurality of EBG structures 200 according to some embodiments.

In the embodiment shown in FIG. 2*a*, the EBG structure 200 includes a first plurality of conductive regions 202*a*, 202*b*, 202*c*, and 202*d* and a second plurality of conductive regions 204*a*, 204*b*, 204*c*, and 204*d*, each separated from one another by etched slots that exposes the underlying antenna substrate 206. As described above, in some embodiments the slots are etched into a planar conductive layer, removing the conductive layer to expose the underlying antenna substrate layer. This is illustrated in the cross-sectional view shown in FIG. 2*b*, in which conductive regions 202*a* and 202*b* are separated from one another by an etched slot in which conductive material is removed to expose the underlying antenna substrate layer 206. It is also worth pointing out in FIG. 2*b* that the conductive regions 202*a*, 202*b* (as well as conductive regions 204*a* and 204*b*) are not connected by vias to bottom conductive layer 207.

In the embodiment shown in FIG. 2*a*, the first plurality of conductive regions 202*a*-202*d* have a geometry defined by lengths L2 and L5. In some embodiments, lengths L2 and L5 are equal to one another, such that conductive regions 202*a*-202*d* are square-shaped. In some embodiments, each of the first plurality of conductive regions 202*a*-202*d* are separated from adjacent conductive regions 202*a*-202*d* in the y-direction by a length L6 and in the x-direction by a length L9. In some embodiments, the lengths L6 and L9 are equal to one another, such that each of the first plurality of conductive regions 202*a*-202*d* are located equidistant from one another.

In some embodiments, a second plurality of conductive regions 204*a*-204*d* are located at least partially surrounding the first plurality of conductive regions 202*a*-202*d*. In some embodiments, the second plurality of conductive regions 204*a*-204*d* are L-shaped. For example, conductive region 204*d* includes a vertical portion 208 (i.e., extending in the y-direction) and a horizontal portion 210 (i.e., extending in the x-direction). The vertical portion 208 is separated from the conductive region 202*d* by a distance L7 and the horizontal portion 210 is separated from the conductive region 202*d* by a distance L8. In some embodiments, the distances L7 and L8 are equal to one another. In addition, in some embodiments each of the second plurality of conductive regions 204*a*-204*d* are separated from adjacent conductive regions 204*a*-204*d* in the y-direction by a distance L3 and in the x-direction by a distance L4. In some embodiments the distances L3 and L4 are equal to one another. In addition, in some embodiments the distance L9 between first conductive regions 202*c* and 202*d* is equal to the distance L4 between second conductive regions 204*c* and 204*d*; and the distance L6 between first conductive regions 202*b* and 202*d* is equal to the distance L3 between second conductive regions 204*b* and 204*d*. In some embodiments, distances L3, L4, L6, L7, L8 and L9 are approximately equal The dimensions of the EBG structure 200 is selected based, at least in part, on the desired stopband. For example, in some embodiments the width of the etched slots, expressed in distances L3, L4, L6, L7, L8 and L9 shown in FIG. 2 are less than the distances L2 and L5 of the first plurality of conductive regions 202*a*, 202*b*, 202*c* and 202*d*. In some embodiments, the width of the etched slots illustrated by distances L3, L4, L5, L7, L8 and L9 are greater than one-half the distances L2 and L4 of the first plurality of conductive regions 202*a*, 202*b*, 202*c*, and 202*d*. In some embodiments, the width of the etched slots are between 0.1 and 0.2 mm, the width of the first plurality of conductive regions 202*a*-202*d* are approximately 0.1 and 0.3 mm and the length of the EBG structure 200 is approximately 0.9 to 1.1 mm.

In the embodiment shown in FIG. 2*c*, a plurality of EBG structures 200*a*, 200*b*, 200*c*, and 200*d* are positioned adjacent to one another to provide the repeating or periodic array utilized between the adjacent antennas. In this embodiment, the second plurality of conductive regions 204 from adjacent EBG structures 200*a*-200*d* form a single conductive structure having a width defined by distance L10 and L11. In some embodiments, the distances L10 and L11 are equal to one another. In some embodiments, the distance L10 and L11 (associated with combined conductive region 204) is approximately the same as distance L2 representing the width of conductive region 202. In other embodiments, the distance L10, L11 is approximately one-half the length of the distance L2, such that the width of the combined conductive regions 204 are narrower than the width of the conductive regions 202. In other embodiments the width of the combined conductive regions 204 may be greater than the width of conductive regions 202 (e.g., distance L10, L11 greater than distance L2).

In the embodiment shown in FIGS. 1*a* and 1*b*, a plurality of EBG structures such as EBG structure 200 (shown in FIGS. 2*a*-2*c*) are utilized in a periodic pattern in the region between receiver antenna 102 and transmission antenna 104. The number of EBG structures 200 utilized may vary based on the application. In the embodiment shown in FIGS. 1*a* and 1*b*, six total rows of EBG structures 200 are utilized in the EBG region 105. In other embodiments, additional or fewer rows of EBG structures may be utilized in the EBG region 105. In some embodiments, the periodic inclusion of EBG structures 200 in EBG region 105 act to reduce surface ripples between adjacent antennas 102 and 104. As discussed above, this reduces coupling between the adjacent antennas 102, 104 and therefore improve the signal-to-noise ratio (SNR) of the antenna board. In radar sensing systems, the improved SNR of the antenna board may increase the detection range of the radar system. In a multiple-input multiple-output (MIMO) system, the reduced surface waves between adjacent antennas may improve the uniformity of the beam vectors generated by the plurality of antennas (e.g., antenna 102 and 104). This reduces the dissimilarity in the antenna radiation pattern and improves the angle-finding accuracy of the antenna board 100.

Figure 3A:
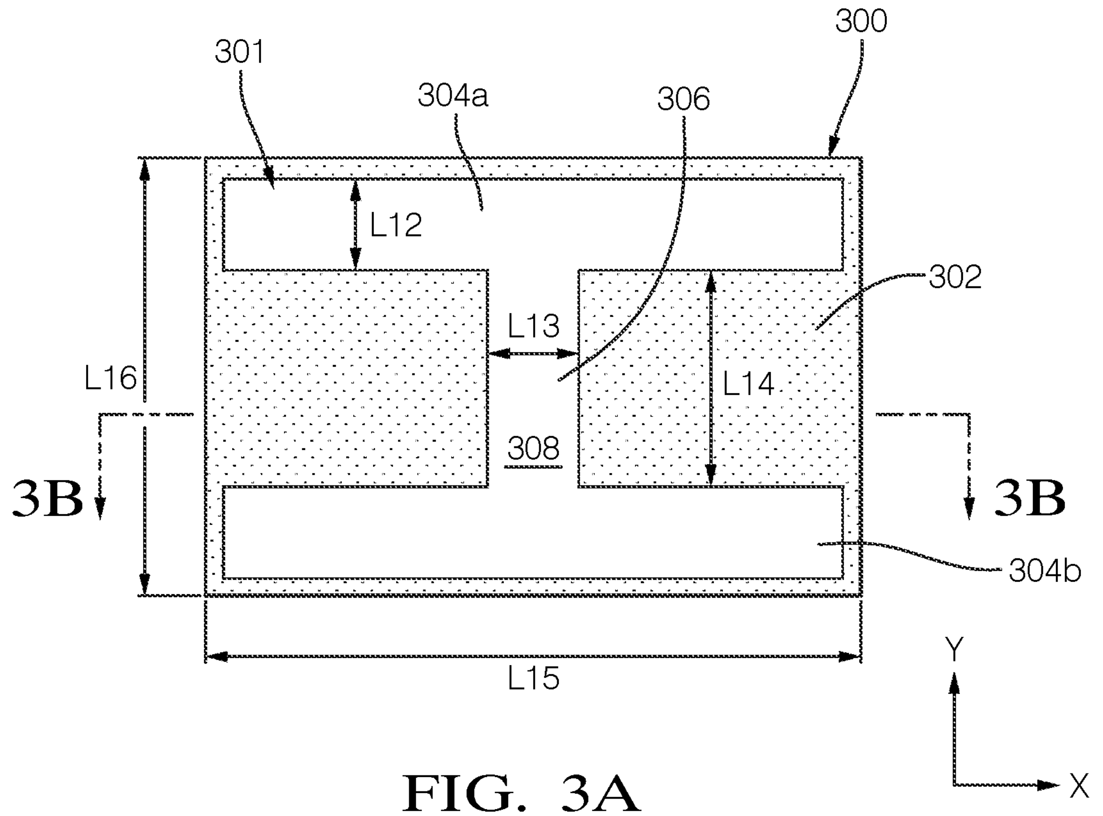
FIG. 3*a* is a top view of a 2D EBG structure according to some embodiments.
Figure 3B:
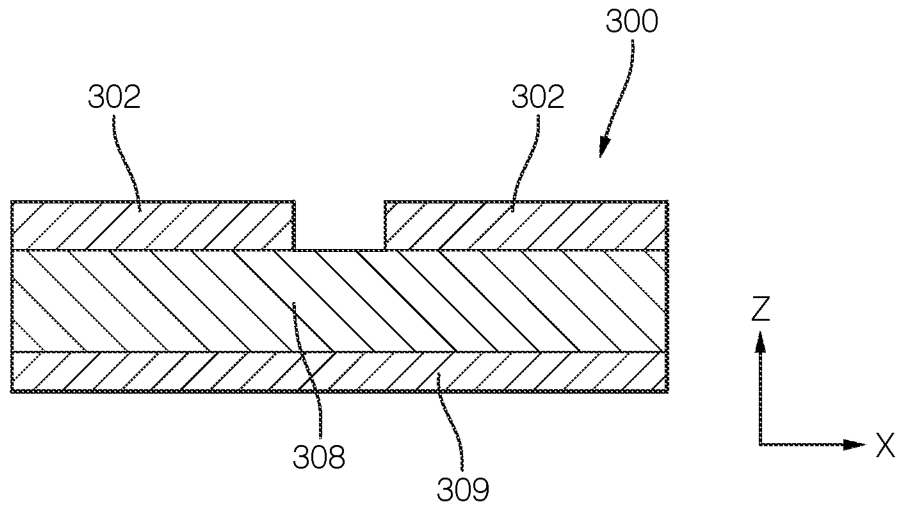
FIG. 3*b* is a top view of a plurality of 2D EBG structure according to some embodiments.
Figure 3C:
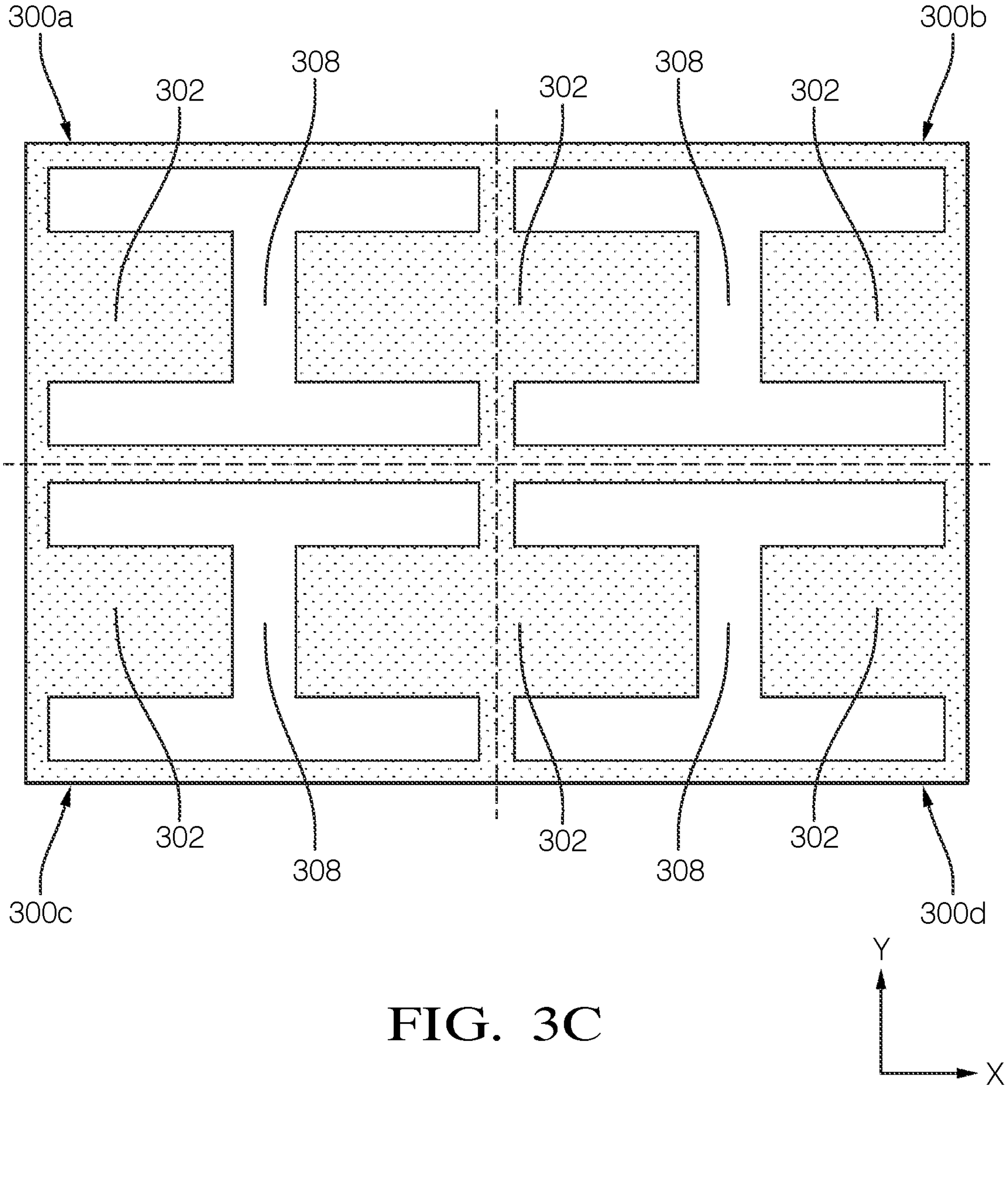
FIG. 3*c* is a cross-sectional view taken along line 3*b*-3*b* in FIG. 3*a*.

Referring to FIGS. 3*a*-3*c*, EBG structure 300 is illustrated according to some embodiments. FIG. 3*a* is a top view of a single EBG structure 300. FIG. 3*b* is a cross-sectional view of the EBG structure 300 taken along line 3*b*-3*b*, and FIG. 3*c* is a top view of a plurality of EBG structures 300 fabricated in a periodic or repeating pattern.

With respect to FIG. 3*a*, EBG structure 300 includes a conductive region 302 and an H-shaped slot 301 that includes first and second horizontal slots 304*a*, 304*b* and vertical slot 306. The vertical slot 306 connects the first and second horizontal slots 304*a*, 304*b*. In some embodiments, the vertical slot 306 is positioned equidistant from each end of the first and second horizontal slots 304*a*, 304*b*. It should be understood that the orientation of the H-shaped slots may be modified such that the H-shaped slot includes first and second vertical slots connected by a horizontal slot (i.e., wherein the EBG structure is rotated 90°). As described above, in some embodiments the H-shaped slot is etched into a planar conductive layer, removing the conductive layer to expose the underlying antenna substrate layer 308. This is illustrated in the cross-sectional view shown in FIG. 3*b*, in which H-shaped slot 301 is etched into conductive layer 302, wherein conductive material is removed to expose the underlying antenna substrate layer 308. As described with respect to FIG. 2*b*, conductive regions 302 are not connected to bottom conductive layer 309 by way of conductive vias.

In some embodiments, the width of the first and second horizontal slot 304*a*, 304*b* is defined by distance L12, and the width of the vertical slot 306 is defined by distance L13. In some embodiments, the distance L12 and L13 are approximately equal. The distance between the first and second horizontal slots 304*a*, 304*b* is defined by distance L14. In some embodiments, the distance L14 is greater than the width L12 and L13 of the slots. In some embodiments, the length of the EBG structure 300 is defined by distance L15 and the height of the EBG structure 300 is defined by distance L16. In some embodiments, the distance L15 is greater than the distance L16, such that the EBG structure 300 is rectangular in shape. In some embodiments, the distance L15 is approximately equal to the distance L16, such that the EBG structure 300 is approximately square in shape. In some embodiments, the distance L15 is equal to between 0.9 and 1.1 mm and the distance L16 is equal to between 0.6 and 0.8 mm. In some embodiments, the width of the slots L12 and L13 is between 0.1 and 0.2 mm, and the distance L14 between the first and second horizontal slots 304*a*, 304*b* is equal to between 0.3 to 0.4 mm.

In the embodiment shown in FIG. 3*c*, a plurality of H-shaped EBG structures 300*a*, 300*b*, 300*c*, and 300*d* are positioned adjacent to one another to provide the repeating or periodic array utilized between the adjacent antennas. In some embodiments, the plurality of EBG structures 300*a*-300*d* are utilized in the EBG region located between adjacent antennas as shown in FIGS. 1*a* and 1*b*. Depending on the application, the number of EBG structures 300 utilized in a periodic pattern between the adjacent antenna (e.g., receiving antenna 102 and transmission antenna 104 shown in FIGS. 1*a* and 1*b*) may vary.

Figure 4:
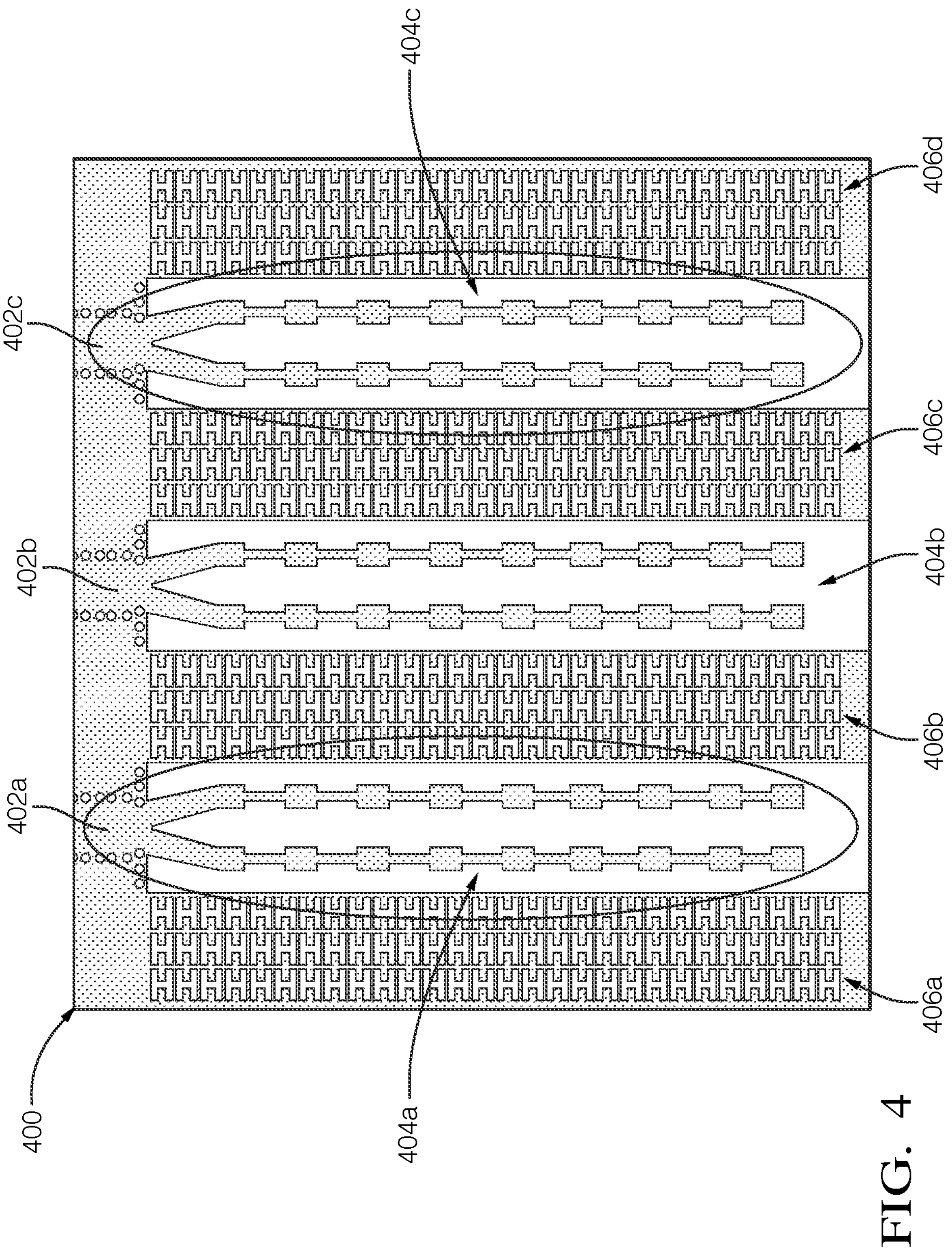
FIG. 4 is a top view of an antenna board utilizing 2D electromagnetic band-gap (EBG) structures according to some embodiments.

Referring to FIG. 4, a multiple input multiple output (MIMO) antenna board 400 is illustrated that utilizes a plurality of antenna sticks 404*a*, 404*b*, and 404*c* separated by a plurality of EBG regions 406*a*, 406*b*, 406*c*, and 406*d*. The MIMO antenna board 400 may be utilized as a multiple input receiving antenna and/or as a multiple output transmitting antenna. Antenna board 400 includes a plurality of inputs/outputs 402*a*, 402*b*, and 402*c*, each of which is connected to a respective antenna stick 404*a*, 404*b*, and 404*c*, respectively. For the same reasons discussed with respect to FIGS. 1*a* and 1*b* in the embodiment utilizing a transmission antenna and a receiving antenna, it is desirable to decrease surface ripples between the plurality of antennas, thereby decoupling the antennas from one another.

In the embodiment shown in FIG. 4, the plurality of EBG regions 406*a*, 406*b*, 406*c*, and 406*d* comprises a plurality of H-shaped EBG structures such as those shown in FIGS. 3*a*-3*c*. In the embodiment shown in FIG. 4, each of the plurality of EBG regions 406*a*, 406*b*, 406*c*, and 406*d* includes three columns of EBG structures. In other embodiments, additional or fewer columns of EBG structures may be utilized between each of the respective antenna sticks 404*a*, 404*b*, and 404*c*. It other embodiments, the EBG structure shown in FIGS. 2*a*-2*c* may be utilized instead of the H-shaped EBG structures.

In some embodiments, the plurality of EBG regions 406*a*, 406*b*, 406*c*, and 406*d* reduces surface ripples between the adjacent antenna sticks 404*a*, 404*b*, and 404*c*, which improves the uniformity of the beam vectors generated by the MIMO antenna. This reduces the dissimilarity in the antenna radiation pattern and improves the angle-finding accuracy of the MIMO antenna board 400.

Figure 5:
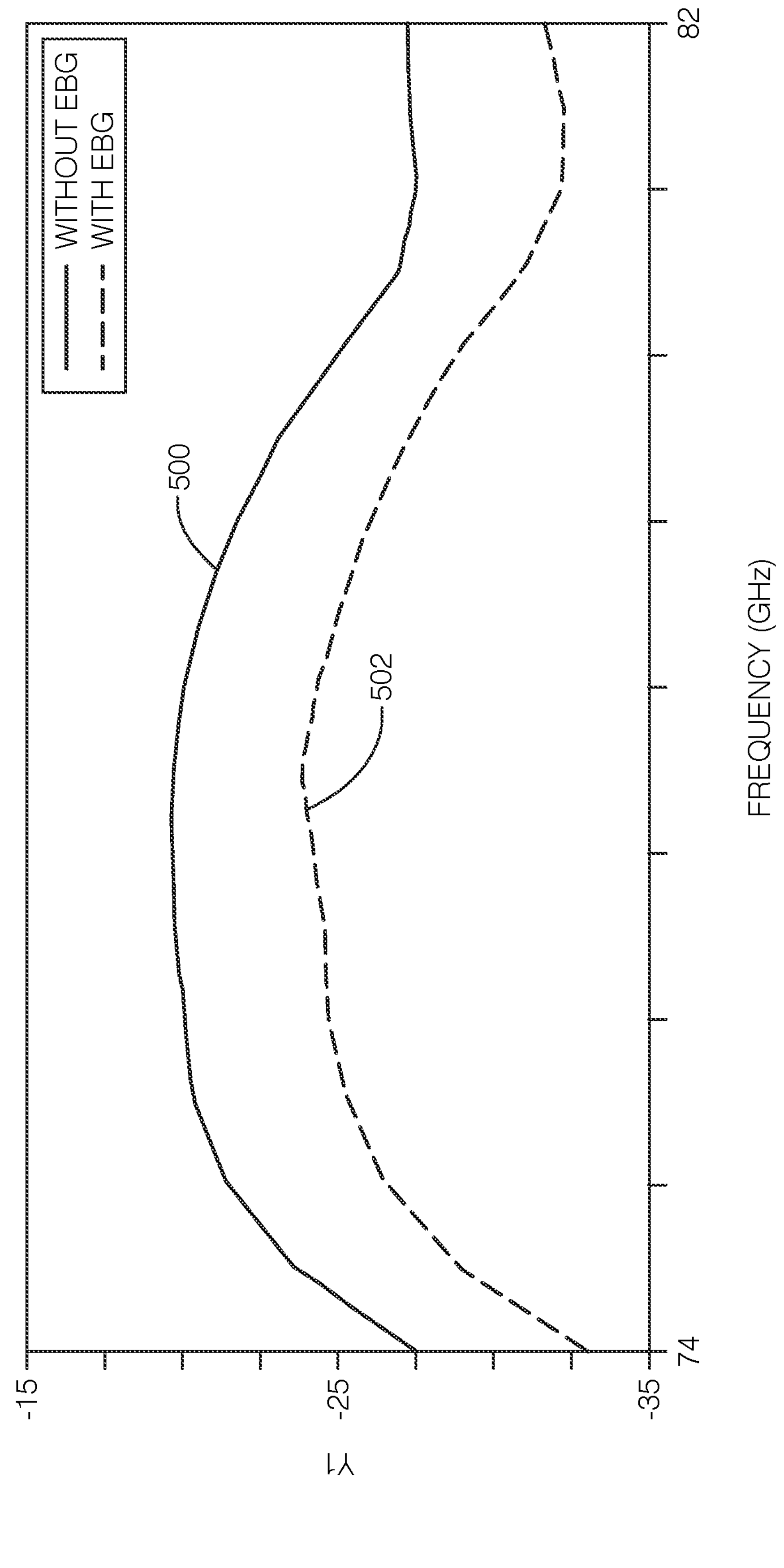
FIG. 5 is a graph illustrating transmission/reception (Tx/Rx) coupling between antennas with and without EBG structures according to some embodiments.

Referring to FIG. 5, a graph illustrating the transmission/reception (Tx/Rx) coupling between antennas with and without EBG structures within a frequency band of between 74 GHz and 82 GHz according to some embodiments is shown. The data presented in FIG. 5 is based on the antenna board 100 shown in FIGS. 1*a* and 1*b*, both with and without the presence of an EBG structure 105. Line 500 illustrates the coupling between the transmission antenna and the receiving antenna without the presence of an EBG region 105. Line 502 illustrates coupling between the antennas in the presence of EBG region 105. The presence of EBG structures reduce coupling between the respective antennas across the monitored frequency band (e.g., 74 GHz-82 GHz). One of the benefits of the disclosed EBG structure is the relatively wide frequency band of the antenna board system.

In this way, the disclosed invention provides a 2D EBG structure for reducing coupling between adjacent antennas fabricated on planar antenna boards, such as slot antennas, stick antennas, and microstrip antennas. The 2D EBG structure is fabricated by etching slots in the top conductive layer in a repeating pattern but does not require modification of the underlying antenna substrate layer. As a result, the EBG structure is defined as 2D because it only requires fabrication (e.g., etching) of the top conductive layer of the planar antenna board. Fabrication of the 2D EBG structure can be performed in conjunction with etching utilized to fabricate the antenna slots and/or antenna sticks, and therefore does not add significantly to the overall cost of antenna board, while providing significant decoupling of antennas within E-band operating frequencies.

Discussion of Possible Embodiments

The following are non-exclusive descriptions of possible embodiments of the present invention.

According to one aspect, an electromagnetic band-gap (EBG) structure includes an antenna substrate layer having a first planar surface and first and second conductive regions fabricated on the first planar surface. The first conductive regions are separated from adjacent first conductive regions by a first distance. The second conductive regions are separated from the first conductive regions by a second distance and at least partially surround the first conductive regions.

The EBG structure of the preceding paragraph can optionally include, additionally and/or alternatively any, one or more of the following features, configurations and/or additional components.

For example, the ERG structure may include a bottom conductive layer located opposite of the first planar surface (adjacent to a second planar surface of the antenna substrate), wherein the first conductive regions and the second conductive regions are separated from the bottom conductive layer by the antenna substrate layer.

The first conductive regions may be separated from one another by slots formed that expose the antenna substrate layer. Likewise, the second conductive regions may be separated from the first conductive regions and from one another by slots formed to expose the antenna substrate layer.

The second conductive regions may have an 'L'-shaped geometry.

The first conductive region may have a square geometry.

The first distance between the first conductive regions (i.e., a first distance) may be approximately equal to the second distance between the first conductive regions and the second conductive regions.

The second conductive regions may be separated from adjacent second conductive regions by a third distance.

The third distance may be equal to the first distance and the second distance.

The first conductive region may be defined by a first width and the second conductive region may be defined by a second width, wherein the second width may be equal to approximately one-half the first width.

According to another aspect, a planar antenna board includes an antenna substrate layer, a top conductive layer, and a bottom conductive layer. The antenna substrate layer has a first planar surface and a second planar surface opposite the first planar surface. The top conductive layer is located on the first planar surface and the bottom conductive layer is located on the second planar surface. A first E-band antenna is fabricated in the top conductive layer, wherein the first E-band antenna configured to receive/transmit an E-band frequency radio frequency (RF) signal. A second E-band antenna is fabricated in the top conductive layer, the second E-band antenna configured to receive/transmit an E-band frequency RF signal, wherein the second E-band antenna is offset in the x-y plane from the first E-band antenna. A periodic array of two-dimensional electromagnetic band-gap (EBG) structures are also fabricated in the top conductive layer. The periodic array of 2D EBG structures is located between the first E-band antenna and the second E-band antenna, wherein each EBG structure includes a plurality of slots formed in the top conductive layer, wherein the periodic array of 2D EBG structures blocks surface waves in the E-band frequency range.

The planar antenna board of the preceding paragraph can optionally include, additionally and/or alternatively any, one or more of the following features, configurations and/or additional components.

For example, each EBG structure may include a conductive region having an H-shaped slot formed within an interior of the conductive region.

The H-shaped slot may include a first slot, a second slot, and a third slot perpendicular to the first and second slots, wherein the third slot extends between a middle portion of the first and second slots.

Each EBG structure may include a first conductive regions located on the first planar surface of the antenna substrate and separated from adjacent first conductive regions by a first distance and second conductive regions located on the first planar surface, wherein the second conductive regions are separated from the first conductive regions by a second distance and wherein the second conductive regions at least partially surround the first conductive regions The second conductive regions may have an 'L'-shaped geometry.

The first conductive regions may have a square geometry.

The first distance may be approximately equal to the second distance.

The second conductive regions may be separated from adjacent second conductive regions by a third distance.

The third distance may be equal to the first distance and the second distance.

The first E-band antenna may be a transmission antenna and the second E-band antenna may be a receiving antenna utilized in a radar sensing system.

The first E-band antenna and the second E-band antenna may be utilized in a multiple-input multiple-output (MIMO) antenna system.

The invention claimed is:

1. An electromagnetic band-gap (EBG) array comprising:
   - an antenna substrate layer having a first, planar surface and a second, planar surface located opposite the first, planar surface;
   - a first conductive layer formed on top of the first planar surface of the antenna substrate layer; and
   - a plurality of H-shaped slots formed within an interior of the first conductive layer, each H-shaped slot in the first conductive layer exposing the first, planar surface of the antenna substrate layer; and
   - wherein the plurality of H-shaped slots are arranged in a region between adjacent antennas to block surface waves between the adjacent antennas.

2. The EBG array of claim 1, wherein the H-shaped slot includes a first slot, a second slot, and a third slot perpendicular to the first and second slots, wherein the third slot extends between a middle portion of the first and second slots.

3. The EBG array of claim 2, wherein the first slot has a first width, the second slot has a second width, and the third slot has a third width.

4. The EBG array of claim 3, wherein the first width, the second width and the third width are equal.

5. The EBG array of claim 3, wherein the first slot and the second slot are separated by a first length, wherein the first length is greater than the first width and the second width.

6. The EBG array of claim 1, wherein the conductive layer is a top conductive layer and further including a bottom conductive layer located adjacent to the second, continuously planar surface, wherein the first conductive layer is separated from the bottom conductive layer by the antenna substrate layer.

7. The EBG array of claim 1, wherein the EBG array has a length and a height, wherein the first slot and the second slot extend along at least a portion of the length and wherein the third slot extends along at least a portion of the height, wherein the length is greater than the width.

8. The EBG array of claim 1, wherein the adjacent antennas are formed in the first conductive layer exposing the first planar surface of the antenna substrate layer, and wherein the adjacent antennas and the plurality of H-shaped slots are formed by etching the first conductive layer at the same time.

9. The EBG array of claim 1, wherein the plurality of H-shaped slots are not electrically coupled to an additional conductive layer in the antenna substrate layer or on the second planar surface of the antenna substrate layer.

10. A planar antenna board comprising:
    - an antenna substrate layer having a first, planar surface and a second, planar surface opposite the first planar surface;
    - a conductive layer located on the first planar surface;
    - a first antenna fabricated in the top conductive layer;
    - a second antenna fabricated in the top conductive layer;
    - a array of H-shaped electromagnetic band-gap (EBG) structures formed within an interior of the conductive layer, the array of H-shaped EBG structures located in a region between the first antenna and the second antenna, wherein each H-shaped EBG structure includes a plurality of slots formed in the conductive layer, wherein the periodic array of H-shaped EBG structures blocks surface waves between the first antenna and the second antenna, each H-shaped EBG structure formed in the top conductive layer exposing the first planar surface of the antenna substrate layer.

11. The planar antenna board of claim 10, wherein the H-shaped EBG structures of the EBG array include a first slot, a second slot, and a third slot perpendicular to the first and second slots, wherein the third slot extends between a middle portion of the first and second slots.

12. The planar antenna board of claim 11, wherein the first slot has a first width, the second slot has a second width, and the third slot has a third width.

13. The planar antenna board of claim 12, wherein the first width, the second width and the third width are equal.

14. The planar antenna board of claim 12, wherein the first slot and the second slot are separated by a first length, wherein the first length is greater than the first width and the second width.

15. The planar antenna board of claim 10, wherein the planar antenna board is a multiple input multiple output (MIMO) antenna board.

16. The planar antenna board of claim 15, wherein both the first antenna and the second antenna are transmitting antennas.

17. The planar antenna board of claim 15, wherein both the first antenna and the second antenna are receiving antennas.

18. The planar antenna board of claim 15, wherein the first antenna is a receiving antenna and the second antenna is a transmitting antenna.

19. The planar antennas of claim 10, wherein the second antenna is offset in the x-y-plane from the first antenna.

20. A method, comprising:

providing an antenna substrate layer having a first, planar surface and a second, planar surface located opposite the first, planar surface;

forming a conductive layer located on the first planar surface;

forming a first antenna fabricated in the top conductive layer;

forming a second antenna fabricated in the top conductive layer;

forming an array comprising a plurality of H-shaped electromagnetic band-gap (EBG) structures arranged in a region between the first antenna and the second antenna within an interior of the conductive layer, each H-shaped EBG structure formed in the top conductive layer exposing the first planar surface of the antenna substrate layer, wherein the array of H-shaped EBG structures blocks surface waves between the first antenna and the second antenna.

* * * * *